(12) United States Patent
Weston

(10) Patent No.: US 8,166,809 B2
(45) Date of Patent: May 1, 2012

(54) IN-TIRE MULTI-ELEMENT PIEZOELECTRIC SENSOR

(75) Inventor: David Alan Weston, Hendersonville, NC (US)

(73) Assignees: Michelin Recherche et Techinque, Granges-Paccot (CH); Societe de Technologie Michelin, Clermont-Ferrand (FR)

( * ) Notice: Subject to any disclaimer, the term of this patent is extended or adjusted under 35 U.S.C. 154(b) by 358 days.

(21) Appl. No.: 12/374,355

(22) PCT Filed: Sep. 20, 2006

(86) PCT No.: PCT/US2006/036697
§ 371 (c)(1),
(2), (4) Date: Nov. 18, 2009

(87) PCT Pub. No.: WO2008/036088
PCT Pub. Date: Mar. 27, 2008

(65) Prior Publication Data
US 2010/0147061 A1    Jun. 17, 2010

(51) Int. Cl.
*G01M 17/02* (2006.01)
*B60C 23/00* (2006.01)

(52) U.S. Cl. .......................................... 73/146; 340/442

(58) Field of Classification Search .............. 73/146, 73/146.2, 146.3; 340/442, 693.1
See application file for complete search history.

(56) References Cited

U.S. PATENT DOCUMENTS

| 3,760,351 | A | 9/1973 | Thomas |
| 3,839,915 | A | 10/1974 | Schlitt |
| 4,061,200 | A | 12/1977 | Thompson |
| 4,510,484 | A | 4/1985 | Snyder |
| 4,862,486 | A | 8/1989 | Wing et al. |
| 5,457,447 | A | 10/1995 | Ghaem et al. |
| 5,749,984 | A | 5/1998 | Frey et al. |
| 6,725,713 | B2 | 4/2004 | Adamson et al. |
| 2003/0056579 | A1* | 3/2003 | Poulbot et al. ............ 73/146 |
| 2005/0103100 | A1* | 5/2005 | Miyoshi et al. ............ 73/146 |
| 2005/0134444 | A1* | 6/2005 | Park et al. ................. 340/445 |
| 2006/0044125 | A1 | 3/2006 | Pierbon |

FOREIGN PATENT DOCUMENTS

| EP | 1 547 827 A2 | 6/2005 |
| EP | 1 816 013 A1 | 8/2007 |
| JP | 2005-186930 | 7/2005 |
| JP | 2006-142993 | 6/2006 |

OTHER PUBLICATIONS

PCT International Search Report for PCT/US06/36697, dated Aug. 20, 2007.

\* cited by examiner

*Primary Examiner* — Lisa Caputo
*Assistant Examiner* — Punam Roy
(74) *Attorney, Agent, or Firm* — Dority & Manning, P.A.

(57) ABSTRACT

Disclosed is an apparatus and methodology for monitoring tire related conditions. A substrate is provided having one or more pairs of sensors mounted thereon. The pairs of sensors are mounted in predetermined relationship to each other at predetermined separation distances such that rotational direction, speed and other parameters of a tire with which the sensors may be associated may be determined. In some embodiments, plural effective pairs of sensors are provided so that mounting orientation of the sensor need not be predetermined.

12 Claims, 3 Drawing Sheets

IN-TIRE MULTI-ELEMENT PIEZOELECTRIC SENSOR

FIELD OF THE INVENTION

The present subject matter relates to tire sensors. More particularly, the present subject matter is directed to piezoelectric tire sensors that are capable of generating signals to deduce the position of host tires mounted on a vehicle.

BACKGROUND OF THE INVENTION

The incorporation of electronic devices with pneumatic tire structures yields many practical advantages. Tire electronics may include sensors and other components for obtaining information regarding various physical parameters of a tire, such as temperature, pressure, number of tire revolutions, vehicle speed, etc. Such performance information may become useful in tire monitoring and warning systems, and may have potential use as a part of a feedback system to regulate or control certain tire and/or vehicle related systems.

U.S. Pat. No. 5,749,984 (Frey et al.) discloses a tire monitoring system and method that is capable of determining such information as tire deflection, tire speed, and number of tire revolutions. Another example of a tire electronics system can be found in U.S. Pat. No. 4,510,484 (Snyder), which concerns an abnormal tire condition warning system.

U.S. Pat. No. 4,862,486 (Wing et al.) also relates to tire electronics, and more particularly discloses an exemplary revolution counter for use in conjunction with automotive and truck tires.

Yet another potential capability offered by electronics systems integrated with tire structures corresponds to asset tracking and performance characterization for commercial vehicular applications. Commercial truck fleets, aviation crafts and earthmover/mining vehicles are all viable industries that could utilize the benefits of tire electronic systems and related information transmission. Tire sensors can determine the distance each tire in a vehicle has traveled and thus aid in maintenance planning for such commercial systems. Vehicle location and performance can be optimized for more expensive applications such as those concerning earth-mining equipment. Entire fleets of vehicles could be tracked using RF tag transmission, exemplary aspects of which are disclosed in U.S. Pat. No. 5,457,447 (Ghaem et al.).

Such integrated tire electronics systems have conventionally been powered by a variety of techniques and different power generation systems. Examples of mechanical features for generating energy from tire movement are disclosed in U.S. Pat. Nos. 4,061,200 (Thompson) and 3,760,351 (Thomas). Such examples provide bulky complex systems that are generally not preferred for incorporation with modern tire applications. Yet another option for powering tire electronics systems is disclosed in U.S. Pat. No. 4,510,484 (Snyder), which concerns a piezoelectric power supply symmetrically configured about a radiating centerline of a tire.

Another typical solution for powering tire electronics systems corresponds to the use of a non-rechargeable battery, which inherently provides an inconvenience to the tire user since proper electronics system operation is dependent on periodic battery replacement. Conventional batteries also often contain heavy metals that are not environmentally friendly and which present disposal concerns, especially when employed in large quantities. Still further, batteries tend to deplete their energy storage quite rapidly when powering electronic applications characterized by complex levels of functionality. Battery storage depletion is especially prevalent in electronic systems that transmit information over a relatively far distance such as from truck wheel locations to a receiver in the truck cabin. Even when batteries are used in electronics systems that transmit from wheel locations to a closer receiver location, information is then typically relayed via hard-wire transmission medium from the RF receiver location to the vehicle cab thus requiring the installation of additional and often-expensive communications hardware in a vehicle.

Yet another known method for deriving power for tire monitoring systems relates to piezoelectric generators that harvest energy produced by the rotation of a host tire. U.S. Pat. No. 6,725,713 discloses a system for generating electric power from a rotating tire's mechanical energy that employs a piezoelectric structure and an energy storage device.

The disclosures of all the forgoing United States patents are herby fully incorporated into this application for all purposes by reference thereto.

While various implementations of piezoelectric sensors in tire electronic systems have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved apparatus for generating tire related signals has been developed.

In an exemplary configuration, a pair of piezoelectric sensors is mounted on a common substrate for placement within a tire.

In one of their simpler forms, paired piezoelectric sensors are mounted as components of a tire electronics system within a tire.

In accordance with aspects of certain embodiments of the present subject matter, methodologies are provided to provide operating power to sensor associated electronics that may be co-located with the piezoelectric sensors.

In accordance with certain aspects of other embodiments of the present subject matter, methodologies have been developed to co-locate one or more power harvesting elements on the substrate supporting the paired piezoelectric sensors.

In accordance with yet additional aspects of further embodiments of the present subject matter, apparatus and accompanying methodologies have been developed to insure generation of tire location determinative signals without regard to the installed orientation of the sensor supporting substrate.

In accordance with yet still further aspects of certain embodiments, apparatus and methodologies are provided to provide long term histories of tire and/or vehicle operations.

In accordance with yet further embodiments, apparatus and methodologies are provided to regulate and/or control certain vehicle related operations based on various sensed conditions.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
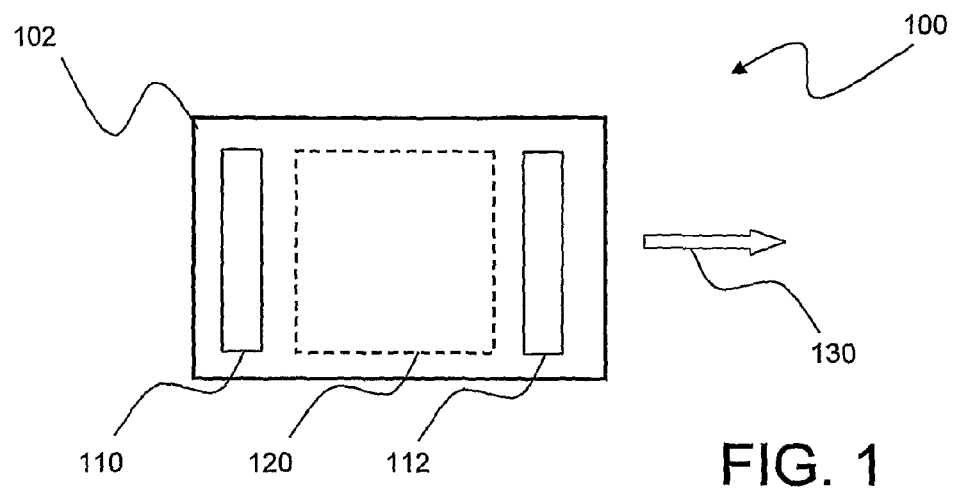
FIG. 1 schematically illustrates a first exemplary embodiment of the present subject matter employing a pair of piezoelectric sensors.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with an improved apparatus for generating tire related signals that may be used to determine tire mounting location on a vehicle as well as other tire related characteristics.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject in-tire multi-element piezoelectric sensor. Referring now to the drawings, FIG. 1 illustrates a first exemplary embodiment of an in-tire multi-element piezoelectric sensor 100 constructed in accordance with the present subject matter.

Multi-element piezoelectric sensor 100 employs a pair of relatively narrow strip piezoelectric sensors 110, 112 mounted in parallel relationship to each other on either end of a substrate 102. Substrate 102 may correspond to any suitable tire compatible material. In an exemplary embodiment substrate 102 may correspond to a fiberglass backing board similar to those commonly used as printed circuit boards in electronic devices. Exemplary piezoelectric materials that may be employed as the piezoelectric sensors 110, 112 include quartz, barium titanate, cadmium sulfide, lead zirconate titanate (PZT), polyvinylidene fluoride (PVDF), and polyvinyl chloride (PVC).

Piezoelectric sensors 110, 112 are mounted at a precisely known distance apart for reasons that will be explained more fully later. In the area between piezoelectric sensors 110, 112, a power harvesting piezoelectric element 120 may optionally be mounted. If provided, the power harvesting piezoelectric element 120 should occupy the maximum possible remaining surface area between piezoelectric sensors 110, 112 and may also have mounted therewith circuitry for conditioning and storing energy harvested by the power harvesting piezoelectric element 120. Each of the piezoelectric elements 110, 112, 120 is electrically isolated from the other piezoelectric elements. Suitable exemplary piezoelectric materials for use as the power harvesting piezoelectric element 120 include the same materials listed hereinabove as exemplary piezoelectric materials for sensors 110, 112. The optional energy conditioning and storage circuitry may be similar to that disclosed in the aforementioned U.S. Pat. No. 6,725,713 (Adamson et al.).

As more fully described later, piezoelectric elements 110, 112 are used exclusively as signal generators to provide tire related signals for later analysis. Power harvesting piezoelectric element 120 may be used to generate similar signals but it has been found that the signals may be affected by any electrical load across the element and thus must be taken into consideration.

The multi-element piezoelectric sensor 100 is configured to be mounted centered on the circumferential centerline of a tire under the crown on the surface of the inner liner and oriented in the rotational direction of the tire as indicated by arrow 130. One of the objectives of providing the sensor configuration as illustrated in FIG. 1 is to provide a time-separable pair of piezoelectric sensor 110, 112 signals such that by knowing their orientation and precise separation distance one may determine both direction of rolling and surface speed of the tire belt package by determining the sequence of signals generated between the pair of sensors and the lag time between generated signals. In addition, the time required for one revolution of the rolling tire may be determined from either of the individual signal piezoelectric sensors 110, 112 signals. Knowing the tire belt velocity and tire angular velocity, the translational speed of the tire may be calculated.

Further, either individual signal piezoelectric sensor 110, 112 may be used to measure the time duration of the contact patch length in either absolute terms or as a ratio of tire belt length. Tire deflection may then also be calculated. If by other means including additional tire mounted sensors, the contained tire air pressure may be determined, then the calculated deflection may be analyzed to determine whether the tire is overloaded or not.

In order to create a tire related "black box" any and all of the measured or calculated parameters hereinabove described may be written periodically into a permanent or rewritable memory device in the tire. Thus a recording of long term tire history as well as a record of most recent tire history may be stored and retrieved or even transmitted to a central processor on the vehicle or to a remote location. It should be appreciated that such accumulated "black box" data could be used in retread decision making for individual tires by examining total miles run, maximum temperature, minimum pressure, maximum deflection, maximum speed, and/or time or miles spent at a set of running conditions. An example of such use could involve the detection of traditional run flat as well as zero inflation not at high deflection, i.e., supported by a dual partner, which has been difficult to detect. Another example use may involve signals generated using the multi-element sensors of the present technology in combination with a temporary spare tire. Tire related signals from such temporary use tires could be made mileage and speed limiting by warning the driver if distance or speed limitations are exceeded and by actually limiting vehicle speed through automatic speed control systems activated by the use of the temporary spare tire.

As previously mentioned, one of the purposes in providing a paired piezoelectric sensor configuration with precise spacing there between is to provide the ability to determine both the direction of rolling and surface speed of the belt package. Assuming that there is a communications system associated with the vehicle to which the in-tire multi-element piezoelectric sensors of the present technology have access, one may provide the so equipped tires with the ability to learn their mounting position on the vehicle.

If one knows for each tire identification (ID) on the vehicle and, in the same time frame, the inflation pressure, the belt speed or tire angular velocity, and the contact patch length or deflection or load, one can deduce a combination of relative tire positions sufficiently to identify each tire ID with a specific position on the vehicle.

As an example, in the case of an eighteen-wheeled truck, any pair of tires mounted dual would have identical angular velocity all the time and therefore steering tires could be identified as the only tires not having a dual partner. During a turn all tires on one side of the vehicle could see a general increase in load and angular velocity while all tires on the other side of the vehicle would see a general decrease in load and angular velocity. Also during a turn a comparison of axle speeds should show a general decrease in angular velocity as one progresses from steer axle to the rear of the vehicle due to decreasing turn radius. In very tight turns the inside trailer tires can actually rotate backward.

During braking the lead axle tires of a tandem would see an increase in load. Other possibilities include selective braking axles through the Anti-lock Braking System (ABS) and knowing which axle is braking or sorting tires on the basis of presence or absence of drive torque. The relative tire data would be seen by the processor as changes or evolutions in time compared to immediate history or to accumulated history. Such data could be time averaged to improve confidence in position decisions or to confirm prior decisions.

The combination of relative data could be enhanced by a different piezoelectric sensor structure if it is not possible to control the installation orientation of the multi-element piezoelectric sensor in the tire. Such enhancement may be achieved though use of a second exemplary embodiment of the present subject matter as illustrated in FIG. 2.

Figure 2:
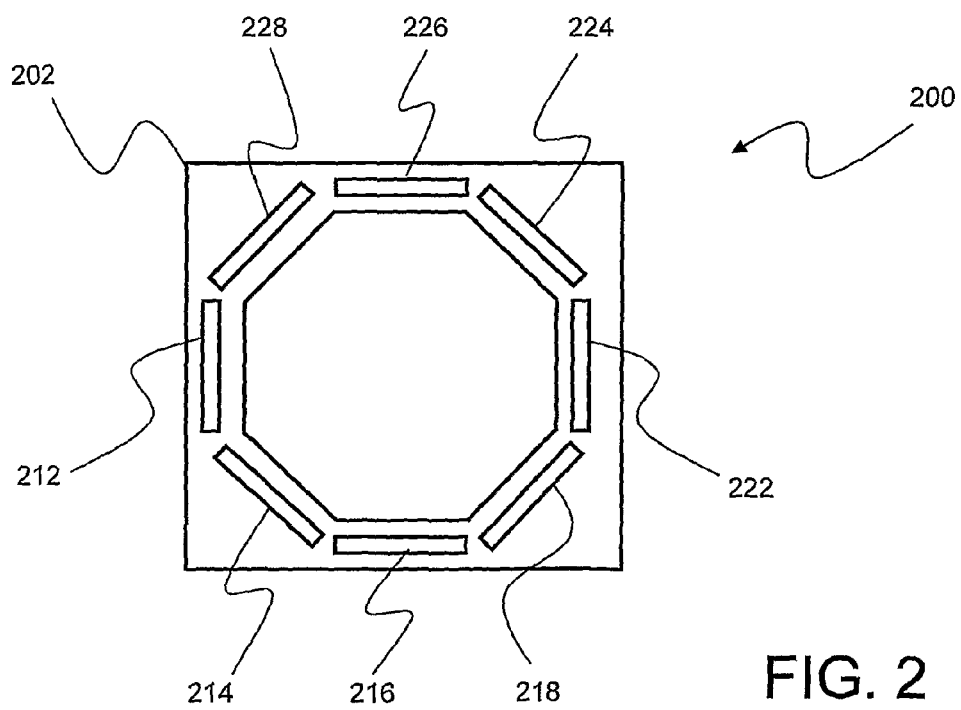
FIG. 2 schematically illustrates a second exemplary embodiment of the present subject matter employing plural pairs of piezoelectric sensors.

With reference now to FIG. 2, there is illustrated a multi-element piezoelectric sensor 200 comprising four pairs of piezoelectric sensors 212, 222, 214, 224, 216, 226, and 218, 228 mounted in a parallel relationship to respective paired piezoelectric sensors and generally in an octagonal configuration around a central axis on a substrate 202. Substrate 202 may correspond to a material generally similar to substrate 102 of the exemplary embodiment illustrated in FIG. 1 while the paired piezoelectric sensors 212, 222, 214, 224, 216, 226, and 218, 228 may correspond to materials similar to that described with respect to piezoelectric sensors 110, 112.

With the paired arrangement of sensors as illustrated in FIG. 2, each of the four opposing pairs of sensors may be interpreted longitudinally as previously described with respect to the exemplary embodiment of FIG. 1. The pair most nearly longitudinally aligned may be determined by determining the piezoelectric pair having the greatest phase difference or time separation between sense signals. Then the pair orthogonal to the identified longitudinal pair may be identified and used to expand the position identification data available to include steering response of the tire in combination with the assessed direction of rolling.

With a multi-element piezoelectric sensor 200 as described above and illustrated in FIG. 2 installed in each tire of a vehicle and, assuming that a communication system exists such that all tires on the vehicle can send various data to a central processing unit on the vehicle, a number of possibilities exist for vehicle control. For example, if data from multi-element piezoelectric sensor 200 is combined with inflation pressure and temperature signals and sent to a central processor connected to the vehicle's electronic control module (ECM) the data could not only contribute to the vehicle tire position learning described previously but could also be used to control vehicle operation in a manner similar to that previously described with respect to a spare tire to control tire running at conditions outside safe operating limits. Such conditions may include, but are not limited to, limitations of combined speed, deflection, load, low inflation pressure. The vehicle driver may be given an audible or visible warning and/or the actual vehicle speed may be limited through the EMC in a manner similar to current systems that may limit engine speed based on engine temperature.

Figure 3:
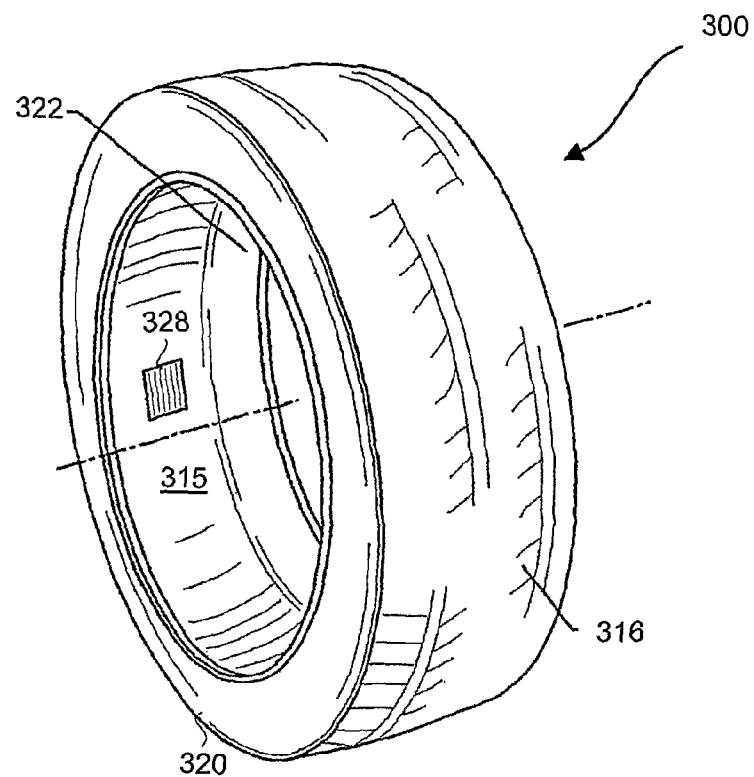
FIG. 3 displays an isometric view of an exemplary tire assembly in accordance with the present subject matter, illustrating an exemplary configuration for orienting a piezoelectric sensor within a pneumatic tire structure.

Referring now to FIG. 3, there is illustrated an exemplary tire assembly including a multi-element piezoelectric sensor 328 mounted within a tire 300. Tire 300 comprises a crown portion 316 having an exterior tread portion, inner and outer sidewall portions 322, 320, respectively and includes an inner liner 315 under the crown area 316 on which multi-element piezoelectric sensor 328 may be mounted.

It should be appreciated by those of ordinary skill in the art that while the present subject matter has been illustrated and described with reference to a sensor combination with a pneumatic tire, other configurations are envisioned. For example, a sensor may be combined with a non-pneumatic device such as the "Tweel" tire and wheel combination currently being developed by the assignee of the present subject matter.

Figure 4:
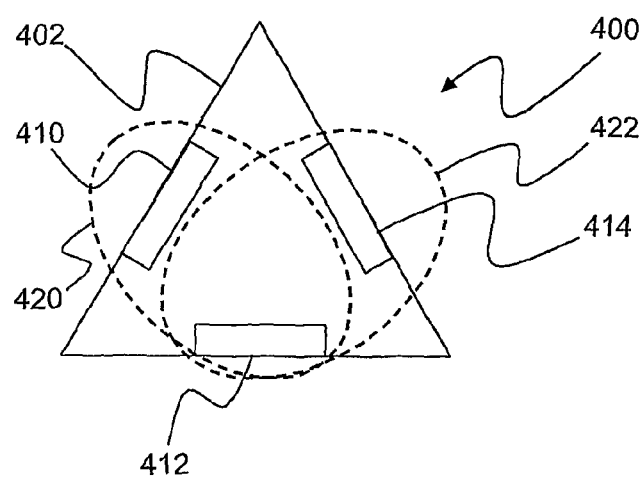
FIG. 4 schematically illustrates a third exemplary embodiment of the present subject matter employing a shared sensor forming two pairs of sensors from three individual sensors.

It should further be appreciated that the present technology while requiring the presence of at least one pair of sensors to obtain presently preferred capabilities is not limited to only a single pair of piezoelectric sensors as illustrated in FIG. 1 or to four pairs of piezoelectric sensors as illustrated in FIG. 2. In fact, the present technology may provide any number of pairs of sensors limited only by physical and other manufacturing considerations and practicalities. In some exemplary embodiments of the present subject matter, for example as illustrated in FIGS. 1 and 2, pairs of sensors may be mounted in parallel arrangements. In certain other embodiments of the present subject matter, two pairs of sensors may be formed using three sensors where one of the three sensors corresponds to one of the elements in each of the pairs. In such an arrangement, the sensors may be arranged in a triangular configuration as illustrated in FIG. 4. Moreover, the present technology may be applied using sensors other than the presently preferred piezoelectric sensors so long as the physical relationship of paired motion sensitive sensors is maintained.

With reference to FIG. 4, it will be seen that there is provided a multi-element piezoelectric sensor 400 employing a group of three piezoelectric sensors 410, 412, 414 mounted on a substrate 402 in a generally triangular configuration. In accordance with the present subject matter, two pair of sensors may be created by including sensor 412 as an element in both of the pairs. In this manner sensors 410, 412 combine to form a first pair of sensors 420 while sensors 412, 414 combine to form a second pair of sensors 422. As with the exemplary embodiment of FIG. 2, mounting orientation of the sensor 400 may be determined by analysis of signals from the various sensors 410, 412, 414.

Figure 5:
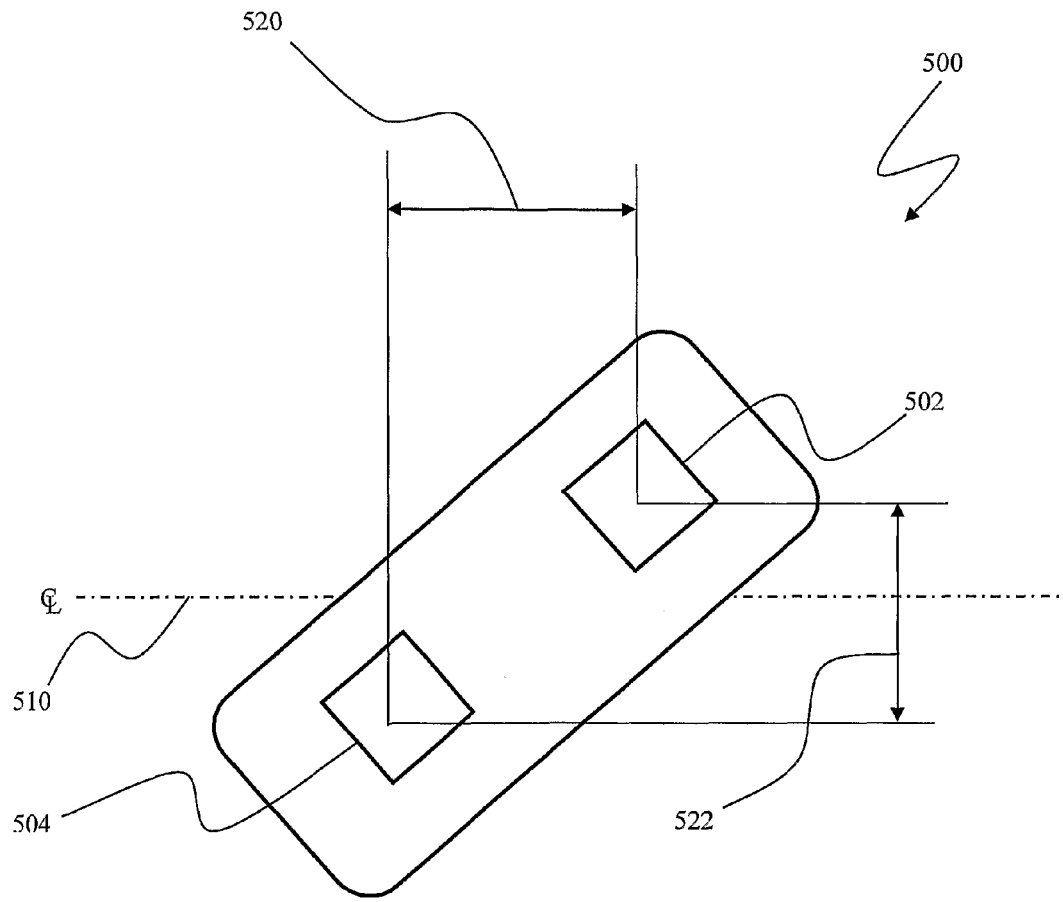
FIG. 5 schematically illustrates a fourth exemplary embodiment of the present subject matter wherein two pairs of sensors are effectively created from a single pair of sensors through known mounting direction.

In yet a further exemplary embodiment of the present subject matter, the concept of sharing sensor identification to define plural pairs may be further expanded as illustrated in FIG. 5 so that similar results may be obtained by providing only two sensors.

With reference to FIG. 5, there is illustrated a fifth exemplary embodiment of the present subject matter wherein there is provided a multi-element piezoelectric sensor 500 employing a pair of piezoelectric sensors 502, 504. As with the first embodiment of the present subject matter illustrated in FIG. 1, the exemplary embodiment illustrated in FIG. 5 requires specific knowledge of the orientation of sensor 500. As illustrated in FIG. 5, if sensor 500 is positioned at an angle to the centerline 510 of the tire with which the sensor is associated, certain movement generated characteristics may be determined.

Referring further to FIG. 5, it will be observed that with sensor 500 mounted at an angle relative to the tire centerline 510, difference 520 between the phases of signals produced by sensors 502, 504 may be used to determine speed and rolling direction of the vehicle. Similarly, difference 522 in the wavelength produced between sensors 502 and 504 may be employed to determine steer direction and magnitude.

The present technology also contemplates, as previously mentioned, not only the incorporation on the same substrate a power generating and harvesting arrangement but also the incorporation of other tire electronics elements and sensors. Such elements and sensors may include, but are not limited to, temperature and pressure sensors, surface acoustic wave (SAW) devices, radio frequency identification (RFID) devices, signal and data storage and transmission components, signal reception components, and data processing components including microprocessors and microcontrollers.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tire sensor, comprising:
   a substrate; and
   at least four pairs of motion sensitive sensors mounted on said substrate,
   wherein each pair of said pairs of motion sensitive sensors are mounted on said substrate in a predetermined relationship to each other and at a predetermined distance from each other in a generally octagonal configuration around a central axis whereby selected tire characteristics may be ascertained by evaluating signals generated by the at least four pairs of motion sensitive sensors.

2. A tire sensor as in claim 1 wherein said at least four pairs of motion sensitive sensors comprise piezoelectric sensors.

3. A tire sensor as in claim 1, further comprising:
   a power harvesting element, wherein said power harvesting element is mounted on said substrate with said at least one pair of motion sensitive sensors.

4. A tire sensor as in claim 3, wherein said power harvesting element comprises a piezoelectric element.

5. The tire sensor of claim 3, wherein said power harvesting element is mounted on said substrate in the area between the at least four pairs of motion sensitive sensors.

6. A tire assembly, comprising:
   a tire;
   a substrate; and
   at least one pair of piezoelectric sensors mounted on said substrate, the sensors of the at least one pair of piezoelectric sensors being mounted on said substrate in a predetermined relationship to each other and at a predetermined distance from each other; and
   a power harvesting element mounted on said substrate in an area between the sensors of the at least one pair of piezoelectric sensors;
   whereby selected tire characteristics may be ascertained by evaluating signals generated by the at least one pair of piezoelectric sensors.

7. A tire assembly as in claim 6, wherein said tire includes crown and sidewall portions, the crown including an exterior tread portion and an interior crown portion including an inner liner associated therewith and wherein said substrate is secured to said inner liner.

8. A tire assembly as in claim 6, comprising:
   at least two pairs of piezoelectric sensors mounted on said substrate, wherein each pair of said pairs of piezoelectric sensors are mounted on said substrate in a predetermined relationship to each other and at a predetermined distance from each other whereby selected tire characteristics may be ascertained by evaluating signals generated by the pairs of motion sensitive sensors without prior knowledge of sensor mounting orientation.

9. A tire assembly as in claim 8, wherein at least four pairs of piezoelectric sensors are mounted on said substrate in a generally octagonal configuration around a central axis.

10. A method for determining selected tire characteristics, comprising:
    providing a tire;
    mounting at least one pair of piezoelectric sensors a predetermined distance apart on a substrate;
    mounting a power harvesting element in an area between the piezoelectric sensors;
    providing the substrate with the tire;
    rotating the tire; and
    evaluating signals generated by the at least one pair of piezoelectric sensors to determine selected tire characteristics.

11. The method of claim 10, wherein mounting at least one pair of piezoelectric sensors a predetermined distance apart on a substrate comprises mounting at least four pairs of piezoelectric sensors, each sensor of each pair in a parallel relationship to each other, on said substrate and further comprising:
    evaluating signals generated by the at least four pairs of piezoelectric sensors to identify the pair of sensors most nearly longitudinally aligned on the substrate relative to the rotational direction of the tire.

12. The method of claim 10, wherein evaluating signals generated by the at least one pair of piezoelectric sensors to determine selected tire characteristics comprises evaluating signals generated by the at least one pair of piezoelectric sensors to determine at least one of direction of tire rotation, speed of tire rotations, steer direction, and tire mounting location.

* * * * *